United States Patent Office 2,934,459
Patented Apr. 26, 1960

---

2,934,459

AZOIC COLORS

Peter C. Canovai, Jr., Pompton Lakes, N.J., assignor to Union Carbide Corporation, a corporation of New York No Drawing. Application August 2, 1957
Serial No. 675,825

2 Claims. (Cl. 117—126)

This invention relates to azo colors and to processes for producing them. More particularly it is concerned with silicon-containing azoic dyestuffs and to processes for their production.

The silicon-containing azoic dyestuffs of the present invention can be represented by the general formula:

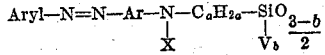

wherein Ar represents an arylene radical such as phenylene and naphthylene radicals, and including substituted phenylene and naphthylene radicals containing as substituents one or more of the group alkyl, alkoxy, nitro, halogen, and the like; X represents a hydrogen atom or an alkyl radical; ($a$) is an integer having a value of at least 3, and preferably of from about 3 to about 5; "Aryl" represents an aryl nucleus, or a substituted aryl nucleus containing as substituents one or more of the group alkyl, alkoxy, aryl, aryloxy, aralkyl, aralkoxy, halogen, nitro, acylamino, trifluoromethyl, carboxamido, sulfonamido, aralkylsulfone, cyano, arylazo, and the like; V represents an hydrocarbon radical, such as an alkyl radical containing from 1 to about 5 carbon atoms, or an aryl radical, such as phenyl; and ($b$) is an integer having a value of from 0 to 3, preferably from 0 to 2; and preferably wherein the nitrogen atom is at least three carbon atoms removed from the silicon atom.

It has now been found that fibrous material, and in particular glass fabrics, can be dyed with silicon-containing azoic dyes by treating the fabric with an arylaminoalkylsilane as represented by the general formula:

(I)

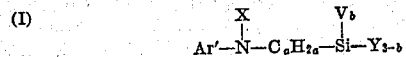

wherein Ar' represents an aryl radical such as phenyl and naphthyl and including lower alkyl, alkoxy, halogen and nitro substituted aryl radicals; Y represents an alkoxy radical such as methoxy, ethoxy, propoxy, and the like; and X, V, ($a$) and ($b$) have the same meanings as hereinbefore defined; and then contacting said treated fabric with a diazotized primary arylamine or fast base.

The arylaminoalkylsilanes suitable for use in impregnating or treating or coating the fabric, and processes for their production, are the subject matter of a copending patent application, Serial No. 615,463, filed October 12, 1956, which is assigned to the same assignee. These arylaminoalkylsilanes can be produced by reacting an arylamine with a haloalkylsilane or an aminoalkylsilane, as represented by the following general equation:

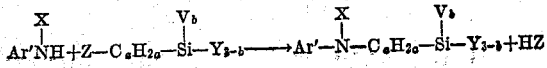

wherein Ar', X, V, Y, ($a$) and ($b$) have the same meanings as hereinbefore defined, and Z represents a halogen atom or amino radical. The reaction can be illustrated, for example, by the reaction of gamma-chloropropyltrimethylsilane with N-methylaniline at about 90° C. to about 100° C. under an inert gas atmosphere whereby N-methyl-N-(gamma-trimethylsilylpropyl)-aniline is produced.

Among the arylaminoalkylsilane coupling components produced by the processes disclosed in Serial No. 615,463, and which can be used as starting materials for treating the fabrics which are to be dyed by the processes of this invention are inter alia:

N-(gamma-trimethylsilylpropyl)-aniline,
N-methyl-N-(gamma-trimethylsilylpropyl)-aniline,
N,N-di-(gamma-trimethylsilylpropyl)-aniline,
N-(delta-trimethylsilylbutyl)-2-methoxyaniline,
N-(gamma-triethylsilylpropyl)2,5-dichloroaniline,
N-(gamma-trimethylsilylpropyl)-3-nitroaniline,
N-(gamma-trimethylsilylpropyl)-alpha-naphthylamine,
N-methyl-N-(gamma-triethoxysilylpropyl)-aniline,
N-(gamma-triethoxysilylpropyl)-aniline,
N-(gamma-triethoxysilylbutyl)-3-nitroaniline,
N-(gamma-methyldiethoxysilylpropyl)-aniline,
N-(gamma-dimethylethoxysilylpropyl)-aniline,
N-(gamma-triethoxysilylpropyl)-alpha-naphthylamine,
N-(delta-dimethylethoxysilylbutyl)-2,5-dichloroaniline, and the like.

The arylaminoalkylsilanes can be applied to the fabric by padding, or by use of a suspension or solution of the arylaminoalkylsilane in water or in a mixture of an organic solvent such as methanol, ethanol or isopropanol, and water. The arylaminoalkylsilane bath may also contain a small amount, from about 0.0005 to about 0.3 and preferably about 0.01% by weight, of a wetting agent. The preferred method for treating the glass fabric is to boil the fabric in the aqueous bath of the arylaminoalkylsilane for a period of from about 15 minutes to about 2 hours, whereby a coating of the silane is formed on the fabric. The pH of the bath is not critical, and can be either acidic, neutral or alkaline as hereinafter shown. Generally the addition of an acid to the bath results in a clean solution. The concentration of arylaminoalkylsilane in the bath is not critical and can vary from about 0.05% by weight up to about 5% by weight of the bath; preferably concentrations of from about 0.1% to about 2% are used. After the fabric has been treated, it is removed from the bath, squeezed and dried. The treated fabric is then contacted with a solution of a fast base, which is a diazotized primary arylamine, whereupon the dyestuff is produced directly on the fabric. Ordinarily the coated fabric in the fast base solution is heated at temperatures above those conventionally employed for azoic dyeings. For example, it has been found that best results are obtained when the fast base solution is maintained at temperatures of from about 50° C. up to the boiling point of the solution.

Among the fast bases or salts which can be used are those listed on pp. 660 and 661 and pp. 702 to 704 of "The Chemistry of Synthetic Dyes," by K. Venkataram, vol. I, 1952, Academic Press, Inc., N.Y., or those listed on pp. 102 and 103 of "The Aromatic Diazo-Compounds and Their Technical Applications," by K. H. Saunders, 1949, Edward Arnold and Co., London. Among these there may be mentioned o-chloroaniline, m-nitroaniline, 2-aminoanisyl-4-benzylsulfone, benzidine, 2-chloro-4-nitrobenzeneazo-2'-amino-5'-methyl-4'-methoxybenzene, p-aminodiphenylamine, alpha-naphthylamine, 4-benzamido-2,5-dimethoxyaniline, 5-chloro-o-toluidine, 2-ethanesulfonyl-5-trifluoromethylaniline, etc.

As is well known in the art, the fast bases can be diazotized and then stabilized. Among the agents useful in stabilizing the azo component, but not as a limitation, there may be mentioned: ethyl taurine, proline, methylglucamine, isopropyl glycine, allyl glycine, and the like; quite often secondary amines containing solubilizing substituents such as carboxylic or sulfonic groups are used as stabilizers. These stabilized fast bases can also be used.

When the arylaminoalkylsilane is non-functional, that is, when (b) in Formula I has a value of 3, then the dyestuff produced on the glass fiber is the monomeric silane as represented by the general formula:

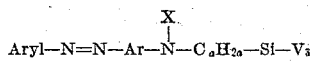

However, when the arylaminoalkylsilane is functional, that is when (b) in Formula I has a value of from 0 to 2, then the dyestuff produced on the glass fabric is a siloxane. For example, a trifunctional aminoarylalkylsilane will produce a dyestuff containing units represented by the general formula:

When a difunctional silane is applied to the cloth, the dyestuff contains units represented by the general formula:

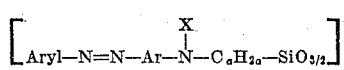

while monofunctional silanes produce dyestuffs containing units represented by the general formula:

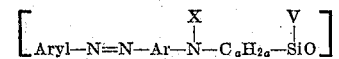

The following examples further serve to illustrate this invention.

Example 1

A piece of glass fabric weighing about 1.1 g. was boiled for 15 minutes in a solution of 0.033 g. of N-(gamma-triethoxysilylpropyl)-N-methylaniline in about 20 ml. of water and about 8 ml. of methanol. The fabric was removed, dried, and placed in a solution of about 0.06 g. of Fast Red AL Salt, the zinc chloride stabilized diazonium salt of 1-aminoanthraquinone, in 50 ml. of water containing one drop of glacial acetic acid. The bath was heated to 60° C. for about 5 minutes, allowed to cool to room temperature over a 45 minute period, and the cloth was then removed, rinsed and dried. The fabric was dyed a rose color with a dyestuff containing units represented by the formula:

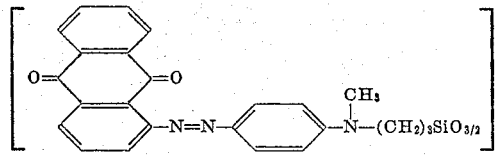

The dyeings possessed a satisfactory degree of fastness to light, laundering and bleaching agents.

In a similar manner glass fabric was dyed with the following fast bases:

(a) Fast Orange GR Salt, the zinc chloride stabilized diazonium salt of o-nitroaniline; an orange dyestuff containing units corresponding to the following general formula was formed on the cloth:

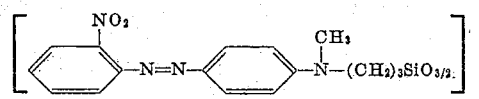

(b) Fast Corinth V Salt, the zinc chloride stabilized diazonium salt of 2-methoxy-4-(2'-nitro-p'-tolylazo)-5-methylaniline; a brown dyestuff containing units corresponding to the following general formula was formed on the cloth:

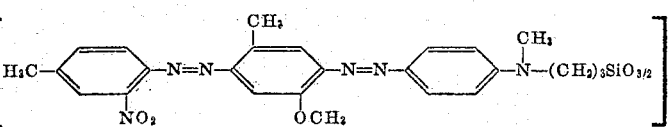

(c) Fast Red ITR Salt, the zinc chloride stabilized diazonium salt of o-anisidine-4-sulfondiethylamide; an orange-brown dyestuff containing units corresponding to the following general formula was formed on the cloth:

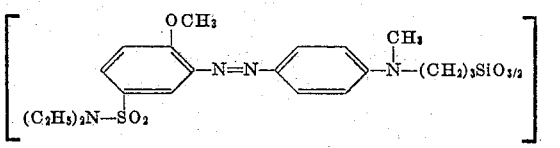

Example 2

A mixture of 0.01 g. of "Triton X-100," a non-ionic alkyl aryl polyether alcohol detergent, and 0.8 g. of N-methyl - N - (gamma-triethoxysilylpropyl)-1-aminonaphthalene dissolved in 1 ml. of ethanol was added to 200 ml. of water and the mixture was stirred for about 3 hours. There was added 4.6 ml. of molar potassium hydroxide to the mixture and it was diluted with water to a 500 ml. volume. A 25.7 g. piece of glass fabric was boiled in this mixture for about one hour, and then removed and dried. The fabric was cut into pieces weighing about 2.5 g. each, and these were dyed by placing them into a solution of a stabilized diazonium salt prepared by dissolving about 0.15 g. of the stabilized diazonium salt in 100 ml. of water containing about 0.5 ml. of glacial acetic acid. The fast salt base was maintained at room temperature. After several hours the dyed fabric was removed, rinsed and dried. The dyeings possessed a satisfactory degree of fastness to light, laundering and bleaching agents. Results with various fast salts are tabulated below:

(a) Fast Blue RR Salt, the zinc chloride stabilized diazonium salt of 4-benzamido-2,5-dimethoxyaniline; a red dyestuff containing units corresponding to the following general formula was produced on the fabric:

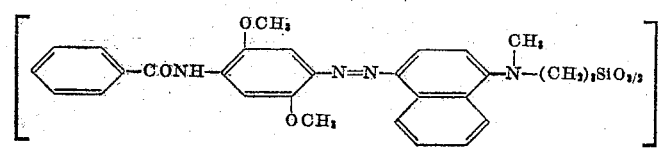

(b) Fast Corinth V Salt, the zinc chloride stabilized diazonium salt of 2-methoxy-4-(2'-nitro-p'-tolylazo)-5-methylaniline; a purple dyestuff containing units corresponding to the following general formula was produced on the fabric:

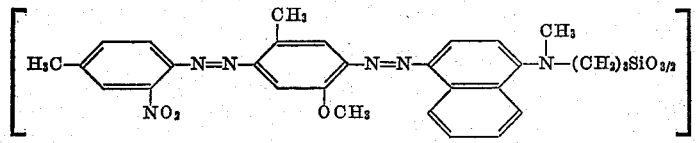

(c) Fast Yellow GC Salt, the zinc chloride stabilized diazonium salt of o-chloroaniline; an orange dyestuff containing units corresponding to the following general formula was produced on the fabric:

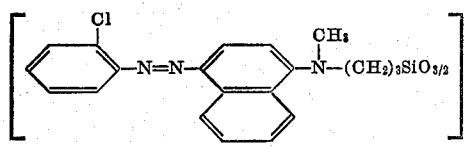

(d) Fast Red ITR Salt, the zinc chloride stabilized diazonium salt of o-anisidine-4-sulfondiethylamide; an orange-brown dyestuff containing units corresponding to the following general formula was produced on the fabric:

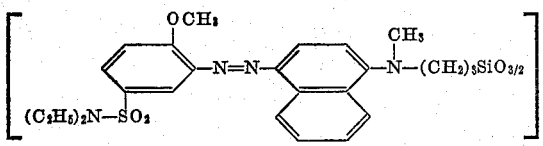

(e) Fast Red AL Salt, the zinc chloride stabilized salt of 1-aminoanthraquinone; a purple dyestuff containing units corresponding to the following general formula was produced on the fabric:

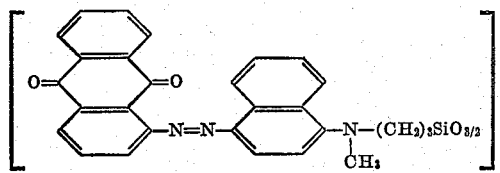

*Example 3*

A stock solution of N-methyl-N-(gamma-trimethylsilylpropyl)-aniline was prepared by adding 0.05 g. of "Triton X-100," a non-ionic alkyl aryl polyether alcohol wetting agent, and 2 g. of N-methyl-N-(gamma-trimethylsilylpropyl)-aniline dissolved in 2 ml. of isopropanol to 500 ml. of water and stirring for 4 hours at room temperature. This solution was used to coat glass fabric at various pH's, as follows:

(a) *Acidic.*—A 56 ml. portion of the stock solution was diluted with water to a 150 ml. volume and 0.35 ml. of 6 molar hydrochloric acid was added. A 7.5 g. piece of glass fabric was placed in the bath and boiled for about 45 minutes, and then removed and dried. The treated glass cloth was then dyed by boiling for about 30 minutes in a bath containing 0.15 g. of Fast Red RBN, dissolved in about 100 ml. of water. The fabric was dyed a dark red color.

(b) *Neutral.*—A 56 ml. portion of the stock solution was diluted to a 150 ml. volume. A 7.5 g. piece of glass cloth was then treated and dyed as described in (a) above. The fabric was dyed a medium red shade.

(c) *Alkaline.*—A 56 ml. portion of the stock solution was diluted to a 150 ml. volume and 1.3 ml. of molar potassium hydroxide solution was then added. A 7.5 g. piece of glass cloth was then treated and dyed as described in (a) above. The fabric was dyed a light orange shade.

What is claimed is:

1. A process for coloring fabric, which comprises the steps of treating the fabric with an arylaminoalkylsilane as represented by the general formula:

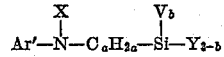

wherein Ar' represents an aryl radical and a substituted aryl radical; X represents a member selected from the group consisting of hydrogen and alkyl radicals; V represents an hydrocarbon radical selected from the group consisting of alkyl radicals and aryl radicals; Y represents an alkoxy radical; (a) is an integer having a value of from 3 to about 8; and (b) is an integer having a value of from 0 to 3; and wherein the nitrogen atom is at least three carbon atoms removed from the silicon atom; contacting said treated fabric with a diazotized primary arylamine, rinsing, and then drying the colored fabric.

2. A process for coloring glass fabric, which comprises the steps of treating the fabric at an elevated temperature with an arylaminoalkylsilane as represented by the general formula:

wherein Ar' represents an aryl radical and a substituted aryl radical; X represents a member selected from the group consisting of hydrogen and alkyl radicals; V represents an hydrocarbon radical selected from the group consisting of alkyl radicals and aryl radicals; Y represents an alkoxy radical; (a) is an integer having a value of from 3 to about 8; and (b) is an integer having a value of from 0 to 3; and wherein the nitrogen atom is at least three carbon atoms removed from the silicon atom; contacting said treated fabric at an elevated temperature with a diazotized fast base, rinsing, and then drying the colored glass fabric.

References Cited in the file of this patent

UNITED STATES PATENTS

| | | |
|---|---|---|
| 2,436,304 | Johannson | Feb. 17, 1948 |
| 2,715,133 | Speier | Aug. 9, 1955 |
| 2,762,823 | Speier | Sept. 11, 1956 |